(12) United States Patent
Berninger et al.

(10) Patent No.: US 6,622,756 B2
(45) Date of Patent: Sep. 23, 2003

(54) HIGHLY FLEXIBLE HOSE END PIECE

(75) Inventors: Alwin Berninger, Augsburg (DE); Stefan Karlinger, Augsburg (DE)

(73) Assignee: Kuka Roboter GmbH (DE)

( * ) Notice: Subject to any disclaimer, the term of this patent is extended or adjusted under 35 U.S.C. 154(b) by 0 days.

(21) Appl. No.: 09/814,370

(22) Filed: Mar. 21, 2001

(65) Prior Publication Data

US 2001/0023767 A1 Sep. 27, 2001

(30) Foreign Application Priority Data

Mar. 24, 2000 (DE) .......................... 200 05 551

(51) Int. Cl.[7] .............................................. F16L 11/00
(52) U.S. Cl. ....................... 138/121; 138/109; 138/120
(58) Field of Search .............................. 138/109, 121, 138/122, 119, 120; 901/2, 14, 19

(56) References Cited

U.S. PATENT DOCUMENTS

| | | | | |
|---|---|---|---|---|
| 3,313,319 A | * | 4/1967 | Osborn et al. | 138/121 |
| 3,902,531 A | * | 9/1975 | Thawley | 138/177 |
| 4,530,379 A | * | 7/1985 | Policelli | 138/109 |
| 4,585,913 A | * | 4/1986 | Yorita | 138/122 |
| 4,921,147 A | * | 5/1990 | Poirier | 138/121 |
| 5,191,916 A | * | 3/1993 | Kanao | 138/122 |
| 5,492,151 A | * | 2/1996 | Wood et al. | 138/121 |
| 5,573,038 A | * | 11/1996 | Kanao | 138/122 |
| 5,704,401 A | * | 1/1998 | Fukui et al. | 138/121 |
| 5,816,108 A | * | 10/1998 | Obata et al. | 138/121 |
| 5,944,059 A | * | 8/1999 | Masui | 138/121 |
| 6,098,663 A | * | 8/2000 | Larsen | 138/121 |

* cited by examiner

*Primary Examiner*—James Hook
(74) *Attorney, Agent, or Firm*—McGlew and Tuttle, P.C.

(57) ABSTRACT

A protective hose, particularly cable guidance hose, for a robot having at least partly externally positioned cables, particularly supply cables for robot tools is characterized by a flexible hose end piece terminally positionable on the protective hose and whose wall thickness at least zonally differs over its length, its wall thickness having a minimum value in the central area.

17 Claims, 4 Drawing Sheets

HIGHLY FLEXIBLE HOSE END PIECE

FIELD OF THE INVENTION

The invention relates to a protective hose, particularly a cable guiding hose, for a robot having at least partly externally positioned cables, particularly supply cables for robot tools.

BACKGROUND OF THE INVENTION

In the case of multiaxial robots with several parts pivotable relative to one another, particularly robot arms, in the case of robot movements spacing changes with respect to the individual parts occur, which must more particularly be taken into account with at least partly externally positioned protective hoses for guiding supply cables for elements and in particular tools of the robot. They must on the one hand be in a position to absorb length changes and on the other in the case of robot movements must undergo minimum loading in order to ensure a high stability and prevent premature damage. In particular the protective hose end located in the vicinity of the robot hand generally pivotable about three axes, due to extreme movements and orientation changes of the robot hand or a tool fixed thereto, is subject to high loading by tensile, compressive and bending stresses.

In order to ensure the protective hose elasticity necessary for absorbing robot hand movements, it is known to guide the same in compensating loops along the robot hand or a robot arm articulated thereto. As these compensating loops must have a certain dimensional stability, the protective hose is made from a relatively hard and consequently brittle material, e.g. polyamide (e.g. PA12), where its wall thickness must not exceed a certain limit in order to ensure the flexibility particularly necessary in the vicinity of the tool. This frequently leads to fatigue failures of the protective hose at its hand-side end and resulting periods of disuse of the robot.

In the case of a robot with at least partly externally positioned cables, the problem of the invention is to ensure an improved cable guidance, which does not or only slightly impairs the robot mobility as a result of a high elasticity and which in particular has a long service life, so as to largely avoid the periods of disuse of the robot caused by protective hose failure.

SUMMARY OF THE INVENTION

In the case of a protective hose of the aforementioned type, this problem is solved according to the invention in that a flexible hose end piece terminally positionable on the protective hose and whose wall thickness at least zonally changes over its length, the said wall thickness having a minimum value in the central area.

As a result of the construction according to the invention, the flexible hose end piece as a result of its greater wall thickness at both ends can be easily coupled both to the protective hose and to the tool, whilst simultaneously ensuring the necessary high flexibility due to its smaller wall thickness in the central area, without its overall strength being impaired. The flexible hose end piece gives the protective hose a long service life, in that it absorbs the movements of the robot hand or the tool and due to the construction according to the invention itself has a long service life.

According to a preferred embodiment the wall thickness of the starting area of the hose end piece roughly corresponds to the wall thickness of the protective hose and the wall thickness of the hose end piece in the starting area thereof more particularly roughly corresponds to the wall thickness in its end area. This gives the two ends of the flexible hose end piece an increased stiffness more particularly corresponding roughly to the protective hose stiffness, so that it can be readily coupled both to the protective hose and e.g. to the robot tool.

In order to prevent a failure of the flexible hose end piece in the immediate vicinity of the terminal connection points, the wall thickness of the hose end piece preferably substantially continuously decreases from its starting area to its central area and increases substantially continuously from its central area to its end area. Alternatively the wall thickness of the hose end piece can also decrease stepwise from its starting area to its central area and increase stepwise from its central area to its end area and in this case the hose end piece e.g. can comprise joined together hose segments having different wall thicknesses.

The hose end piece appropriately has a ring or helically corrugated wall, which in per se known manner gives it an increased flexibility. The wall of the hose end piece can e.g. be corrugated in a substantially rectangular, sinusoidal or sawtooth-like manner.

With such a hose end piece construction preferably its wall thickness mainly changes in the substantially axially positioned wall sections, whereas in the substantially radially wall portions it remains substantially constant. It has surprisingly been found that such a zonally differing wall thickness of the hose end piece brings about elasticity characteristics roughly corresponding to the continuously varying wall thickness and in particular the hose end piece flexibility is not or is only slightly impaired. This makes it possible e.g. to bring about an easy manufacture of the inventive hose end piece by extrusion, because during such an extrusion the material excess produced in the vicinity of the ends of the hose end piece is mainly accumulated in the axial wall sections and leads there to a greater wall thickness, whereas the thickness of the radial wall sections remains essentially unchanged.

Advantageously the starting area of the hose piece can be terminally fixed to the protective hose by means of a wearing ring. It is advantageously fixable at the end remote from the protective hose to the robot or robot tool by means of a hose clip.

As a function of the robot dimensions, the hose end piece length preferably is between 50 and 1000 mm, particularly between 100 and 500 mm.

Whilst the protective hose can be made from conventional hard, brittle and consequently relatively dimensionally stable material, the flexible hose end piece is preferably made from a softer, wear-resistant material, so that it is mainly the hose end piece which absorbs the robot movements.

The invention also relates to a hose end piece for a protective hose of the aforementioned type and to a robot with at least partly externally positioned cables, which is equipped with a protective hose having such a hose end piece.

BRIEF DESCRIPTION OF THE DRAWINGS

The invention is described hereinafter relative to a preferred embodiment and the attached drawings, wherein show.

DETAILED DESCRIPTION OF THE DRAWINGS

Figure 1:
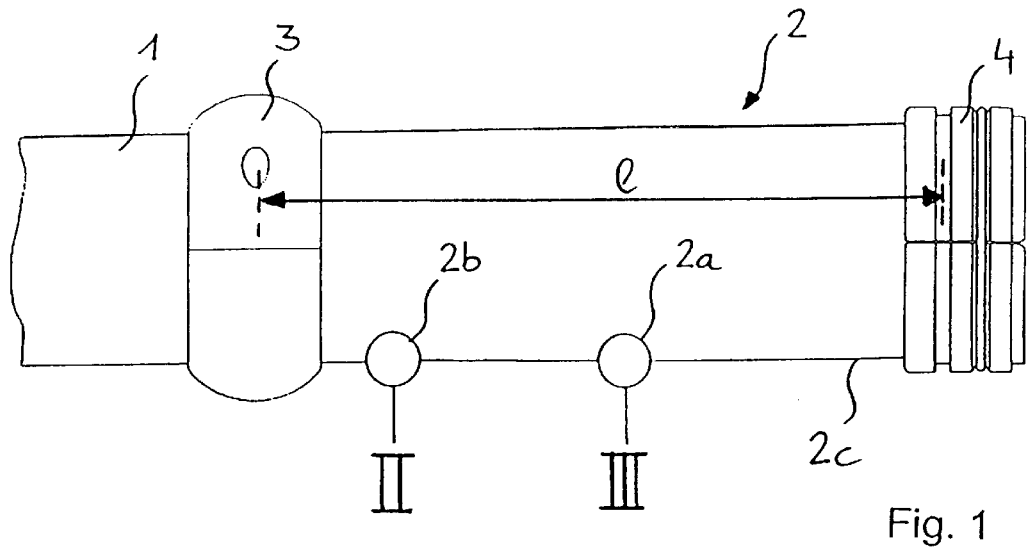
FIG. 1 A diagrammatic side view of a protective hose provided with a flexible hose end piece.

FIG. 1 shows a protective hose 1, such as a cable guidance hose, for a robot with at least partly externally positioned, not shown cables. The protective hose 1 more particularly comprises a relatively dimensionally stable, hard material, e.g. a polyamide. The protective hose 1 is provided in its starting area facing a not shown robot hand with a flexible hose end piece 2, which in its starting area 2b facing the protective hose 1 is butt jointed to the protective hose 1 by means of a wearing ring 3. The end area 2c of the hose end piece 2 facing the robot hand or remote from the protective hose 1 is once again equipped with a hose clip 4, so that in simple manner it can be coupled to a robot tool. The length 1 of the hose end piece 2 is e.g. 200 to 300 mm.

Figure 2:
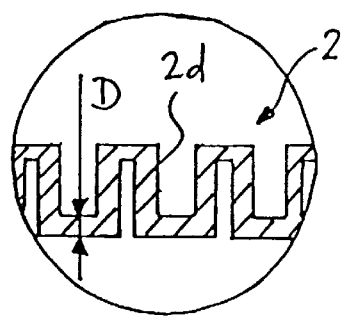
FIG. 2 A view of the detail II in FIG. 1 of the wall of the starting area of the hose end piece.
Figure 3:
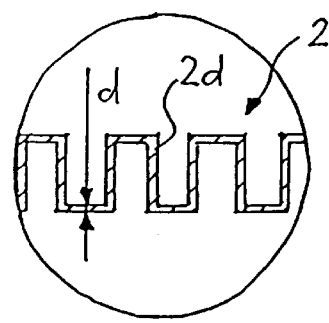
FIG. 3 A view of detail III in FIG. 1 of the wall in the central area of the hose end piece.

As can be gathered from FIGS. 2 and 3, the thickness of the wall 2d of the hose end piece 2 varies over its length 1, the wall thickness d in the central area 2a of the hose end piece (FIG. 3) being smaller than the wall thickness D in its starting area 2b (FIG. 2). The wall thickness D of the hose end piece 2 in its starting area 2b more particularly roughly corresponds to its wall thickness in the not shown end area 2c, so that it is substantially symmetrical. The wall thickness of the hose end piece 2 e.g. substantially continuously decreases from its starting area 2b to its central area 2a and substantially continuously increases from its central area 2a to its end area 2c. In the construction shown the wall 2d of the hose end piece 2 is corrugated in a substantially rectangular manner.

As a result of the construction according to the invention the flexible hose end piece 2 both in its starting area 2b and in its end area 2c has a greater stiffness than in its central area 2a, so that it can be easily coupled both to the protective hose 1 and to the tool. The smaller wall thickness d in the central area 2a gives it a high flexibility without impairing its overall strength, so that the protective hose 1 equipped with the hose end piece 2 has a long service life.

Figure 4:
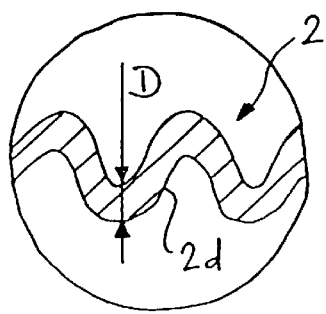
FIG. 4 A detail view of an alternative construction of the wall of the starting area of the hose end piece.
Figure 5:
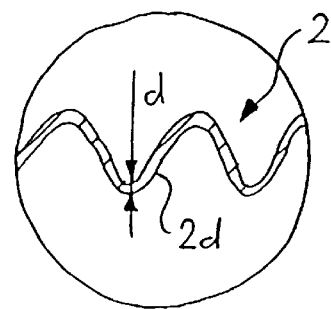
FIG. 5 The wall of the hose end piece in FIG. 4 in the end area thereof.

The hose end piece 2 shown in FIGS. 4 and 5 differs from the hose end piece according to FIGS. 1 to 3 in that it has a substantially sinusoidally corrugated wall 2d. Alternatively it is e.g. possible to provide a substantially sawtooth-shaped wall (not shown).

Figure 6:
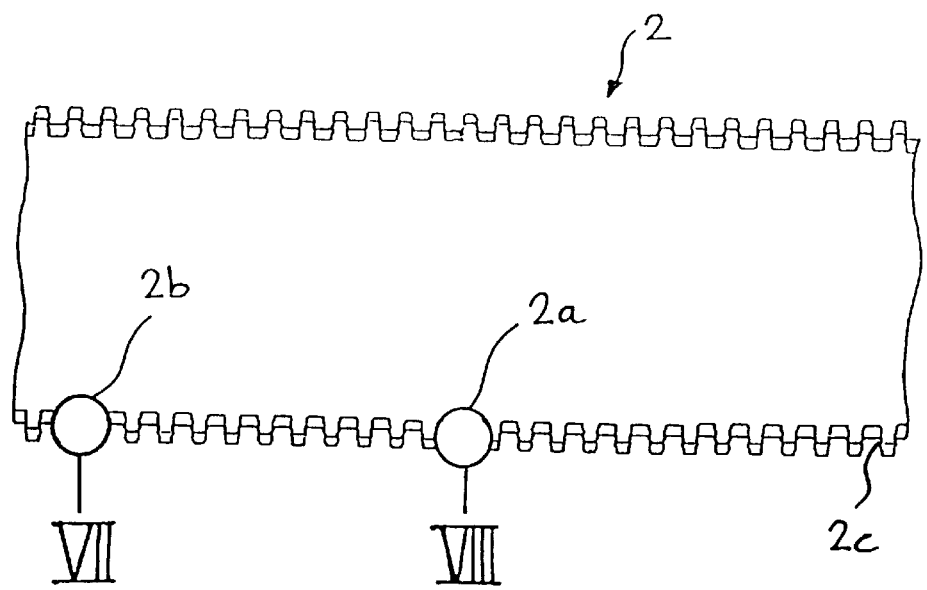
FIG. 6 A diagrammatic side view of another embodiment of a flexible hose end piece.
Figure 7:
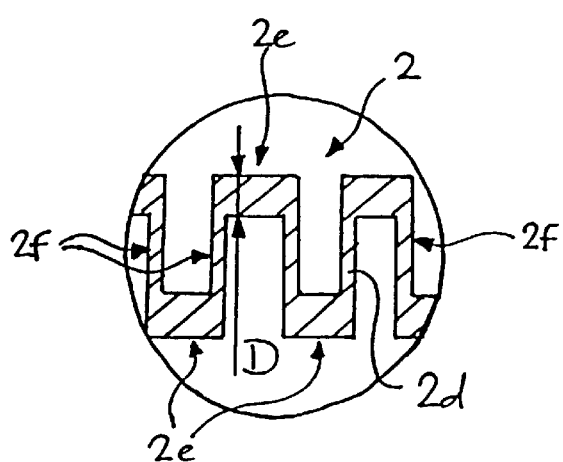
FIG. 7 A view of detail VII in FIG. 6 of the wall in the starting area of the hose end piece.
Figure 8:
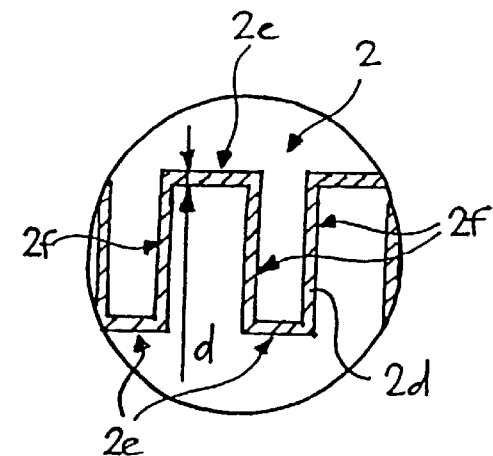
FIG. 8 A view of detail VIII in FIG. 6 of the wall in the central area of the hose end piece.
Figure 9:
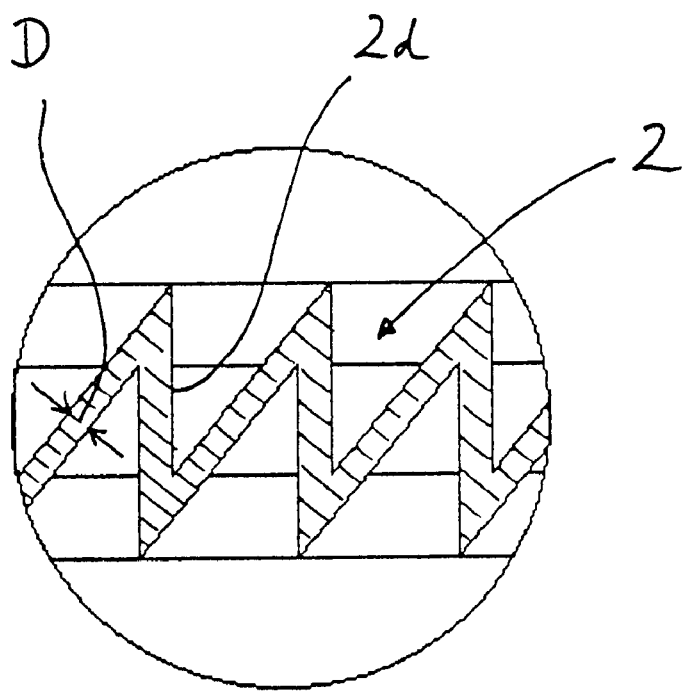
FIG. 9 is a view detail VII in FIG. 1 of sawtooth construction of the wall of the starting area of the hose end piece.
Figure 10:
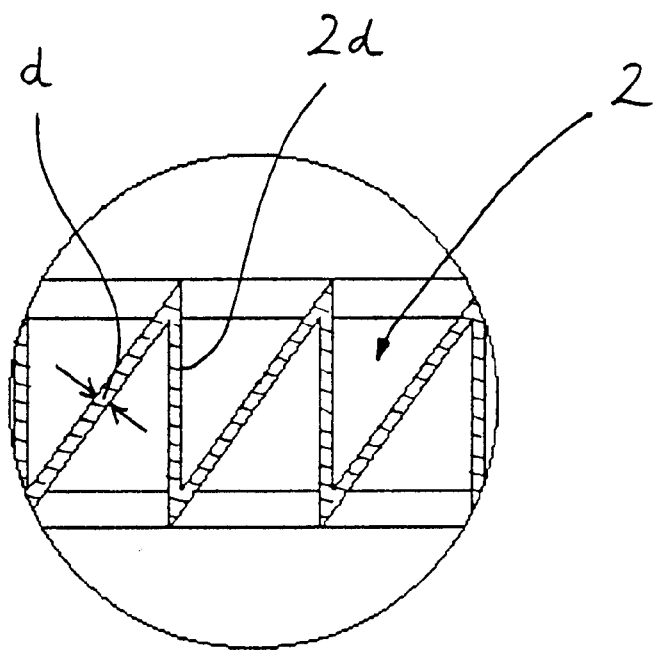
FIG. 10 is a view of detail VIII in FIG. 1 of sawtooth construction of the wall in the central area of the hose end piece.

FIG. 6 shows a broken away hose end piece 2 with a substantially rectangularly corrugated wall 2d, whose wall thickness changes zonally over its length, the wall thickness mainly changing in the axially positioned wall sections 2e, whilst it remains substantially constant in the radially positioned wall sections 2f (FIGS. 7 and 8). The wall thickness d of the axially positioned wall sections 2e of the hose end piece 2 has a minimum in the central area 2a and increases continuously e.g. in the direction of the starting area 2b and end area 2c of the hose end piece 2.

The hose end piece 2 is more particularly made from a wear-resistant material, which is softer than the material of the protective hose 1. It is e.g. made from an extruded plastic.

List of Reference Numerals

1 Protective hose
2 Hose end piece
2a Central area
2b Starting area
2c End are
2d Wall
2e Axial wall section
2f Radial wall section
3 Wearing ring
4 Hose clip
d Wall thickness in central are
D Wall thickness in the starting area
l Length of the hose end piece

What is claimed is:

1. A protective robot hose for guiding cables, for a robot with at least partly externally positioned cables for supplying robot tools, the protective hose comprising:
    a flexible hose end piece provided as an end of the protective hose;
    wherein the flexible hose end piece is provided with corrugations along its length;
    wherein the corrugations have changing wall thickness at least over parts of the length of the flexible hose end piece; and
    wherein the wall thickness of the corrugations has a minimum value in the central area of the flexible hose end piece;
    a hose clip arranged on one end of said hose end piece, said hose end clip coupling said hose end piece to one of the robot tools.

2. Protective hose according to claim 1, wherein the wall thickness of the hose end piece in its starting area roughly corresponds to the wall thickness of the protective hose.

3. Protective hose according to claim 1, wherein the wall thickness of the hose end piece in the starting area thereof roughly corresponds to the wall thickness in its end area.

4. Protective hose according to claim 1, wherein the wall thickness of the hose end piece substantially continuously decreases from its starting area to its central area and substantially continuously increases from its central area to its end area.

5. Protective hose according to claim 1, wherein the wall thickness of the hose end piece decreases stepwise from its starting area to its central area and increases stepwise from its central area to its end area.

6. Protective hose according to claim 5, wherein the hose end piece is formed form joined together hose segments with different wall thicknesses.

7. Protective hose according to claim 5, wherein the hose end piece has a ring or helically corrugated wall.

8. Protective hose according to claim 7, wherein the wall of the hose end piece is substantially rectangularly corrugated.

9. Protective hose according to claim 7, wherein the wall of the hose end piece is substantially sinusoidally corrugated.

10. Protective hose according to claim 7, wherein the wall of the hose end piece is corrugated in a substantially sawtooth-shaped manner.

11. Protective hose according to claim 7, wherein the wall thickness of the ring or helically corrugated hose end piece mainly changes in the substantially axially positioned wall sections, whilst remaining substantially constant in the substantially radially positioned wall sections.

12. Protective hose according to claim 1, wherein the hose end piece is terminally fixed to the protective hose by a wearing ring.

13. Protective hose according to claim 1, wherein the length of the hose end piece is between 50 and 1000 mm.

14. Protective hose according to claim 1, wherein the length of the hose end piece is between 100 and 500 mm.

15. Protective hose according to claim 1, wherein the hose end piece is made from a soft, wear-resistant material.

16. A protective robot hose according to claim 1, further comprising guiding cables in the protective robot hose for a robot having the guiding cables at least partly.

17. A protective robot hose according to claim 1, in combination with a robot with at least partly externally positioned cables for supplying robot tools, the cables being disposed in the protective hose.

* * * * *